Jan. 19, 1965   H. FISCHER ETAL   3,166,053
MONOBLOC AIR-COOLED INTERNAL COMBUSTION ENGINE CYLINDER
Filed Nov. 18, 1963   3 Sheets-Sheet 1

INVENTORS
Hans Fischer
Siegfried Meurer
Julius Liebel
BY Bailey, Stephens and Huettig
ATTORNEYS Jan. 19, 1965  H. FISCHER ETAL  3,166,053
MONOBLOC AIR-COOLED INTERNAL COMBUSTION ENGINE CYLINDER
Filed Nov. 18, 1963  3 Sheets-Sheet 2

INVENTORS
Hans Fischer
Siegfried Meurer
Julius Liebel
BY Bailey, Stephens and Huettig
ATTORNEYS

3,166,053
MONOBLOC AIR-COOLED INTERNAL COMBUSTION ENGINE CYLINDER

Hans Fischer, Siegfried Meurer, and Julius Liebel, Nurnberg, Germany, assignors to Maschinenfabrik Augsburg-Nurnberg AG., Nurnberg, Germany
Filed Nov. 18, 1963, Ser. No. 324,539
Claims priority, application Germany, Dec. 3, 1962, M 54,991
6 Claims. (Cl. 123—41.69)

This invention relates to a monobloc air-cooled piston engine cylinder for an internal combustion engine. In particular, this invention is directed to a monobloc cylinder having an integral liner forming the working surface for a piston. This cylinder is usable in all types of reciprocating machinery, but is particularly applicable to an air-cooled internal combustion engine. Cylinders of this type are often composed of a light metal alloy and fitted with a cast iron or steel liner. In view of the high thermal stresses currently permissible in automotive internal combustion engines, especially diesel engines, very high pressures and working temperatures occur and produce high stresses and steep temperature gradients which must be accounted for. It is important that the light metal alloy used for the cylinder should be an alloy having good heat dissipation properties and, above all, has a sufficiently high strength to ensure that the cylinder head portion of the monobloc can resist the high compression and combustion pressures in the cylinder.

A cylinder composed of a single light metal casting with a liner inserted or pressed in the cylinder is well adapted to meet these conditions. However, such a light metal cylinder has the disadvantage in that combined high tensile and bending stresses occur at the transition between the cylinder head portion and the cylinder portion of the monobloc which necessitates large cross-sectional areas in this region of the casting. This means that only short cooling fins can be used, especially in the case of multi-cylinder engines due to the necessary narrow spacing between the cylinders in the central vertical plane through the crank shaft. In other words, the cooling fins must be made shorter between cylinders rather than being preferably circular. This causes unequal heat dissipation and may result in thermal difficulties from heat concentrations which, in turn, causes greater cylinder distortions than in the case where the fins were truly circular. In addition, such tends to affect the stiffness of the cylinder in the plane of the crank shaft.

The object of this invention is to avoid such difficulties by reducing the bending stresses in the transitional area between the cylinder head portion and the cylinder portion of the monobloc which, in turn, permits a smaller cylinder diameter and longer cooling fins, or, alternatively, a closer cylinder spacing.

In general, this invention provides that the transitional area between the cylinder head portion and the cylinder portion be relieved from tensile and bending stresses by having the liner extended into the cylinder head portion and tightly joined to the head portion. In addition, this liner extension is designed so that the liner receives a large portion of the forces occurring on the cylinder head portion. This means that the cross-sectional area of the cylinder can be made smaller and the cooling fins made larger, or a closer cylinder spacing can be used. Moreover, an additional firm anchorage of the liner is obtained by casting the liner in the cylinder head portion.

An improved feature of this invention is obtained by forming radially directed holes in the liner extension, which holes are filled with the cylinder material when the cylinder is cast around the liner. This forms an absolutely firm joint between the liner and the cylinder head portion in addition to obtaining a good heat transfer and a reduction of the tensile and bending stresses in the transition zone between the cylinder head portion and the cylinder portion.

Another feature of this invention lies in giving the liner extension a shape other than being straight. Thus the cylinder extension is given a dove-tail contour, or a stepped or saw tooth shape on the inner side of the liner extension. Such shapes give a larger surface contact area and consequently lower stresses per unit of surface area, as well as a positive connective joint.

In another modification of the invention, at least two studs or bolts are formed either integral with the liner or screwed to the top end of the liner and preferably arranged diametrically across the liner. These bolts or studs pass through the cylinder head portion. A bridge means preferably formed of steel rests on the center of the cylinder head portion between the bolts and held by a nut threaded on the end of each bolt. This reduces deflection of the cylinder head portion to a minimum so that they are practically eliminated and the bending stresses in the transition zone between the cylinder head portion and the cylinder portion substantially disappear.

In a further modification of this invention, the bridge means between the bolts is composed of a housing for the valve rocker arms and their fittings. As the housing is hollow, it can be designed with a complete stiffness with no bending and takes up the bending forces without deflection.

The means by which the objects of the invention are obtained are described more fully with reference to the accompanying drawings in which.

Figure 1:
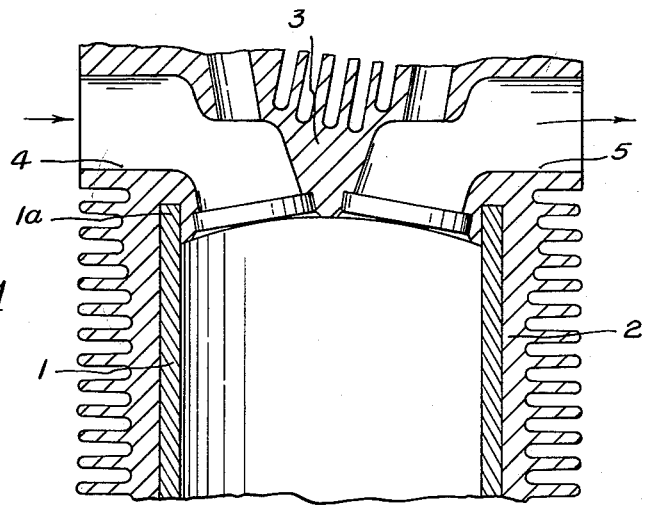
FIGURE 1 is a longitudinal cross-sectional view through the monobloc cylinder of this invention.

In FIGURE 1, the liner 1 has cast around it a finned cylinder 2 so that it is integral with the cylinder head. The casting is preferably done by an aluminium bonding process. The intake port 4 and the exhaust port 5 are formed in the cylinder head portion 3. Liner 1 has an extension 1a extending into the head portion so that the casting is on both sides of the extension and produces a securely placed or shrunk joint between the liner and the head portion. If an aluminium bonding process is used, substantial additional adhesion is provided between the liner and the head portion by the composite layer.

Figure 2:
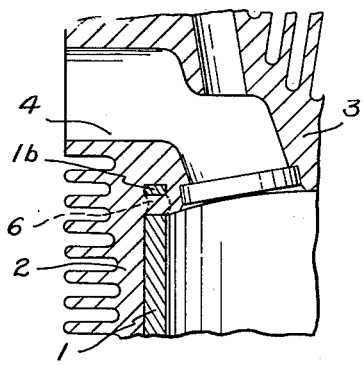
FIGURE 2 is a similar view of a portion of FIGURE 1 showing a modified form of the invention.

In the modification of FIGURE 2, radially directed holes 6 are formed through liner extension 1b and uniformly around the circumference. The cast cylinder material flows through these holes to form an additional connection between the liner and the head portion.

Figure 3:
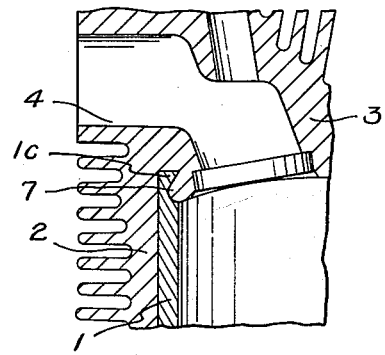
FIGURE 3 is a view similar to FIGURE 2 and showing another modification of the invention.

In the modification of FIGURE 3, the extension 1c is in the shape of a dove-tail so that a dove-tail joint 7 is formed between the liner 1 and the cylinder head portion 3.

Figure 4:
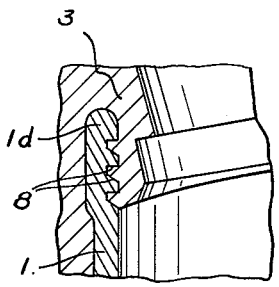
FIGURE 4 is a view similar to FIGURE 2 and showing another modification of the invention.

In the modification of FIGURE 4, the liner extension 1d is shaped with saw tooth serrations 8. The cast cylinder material flows into the serrations during the casting so that a solid joint is formed between the liner and the cylinder, and the liner is capable of effectively transmitting the compression and combustion forces produced on the cylinder head portion 3.

Figure 5:
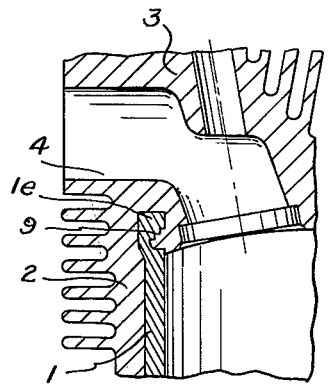
FIGURE 5 is a view similar to FIGURE 2 and showing a further modification of the invention.

The modification of FIGURE 5 is similar to that of FIGURE 4 except that the liner extension 1e is machined to form stepped grooves 9.

Figure 6:
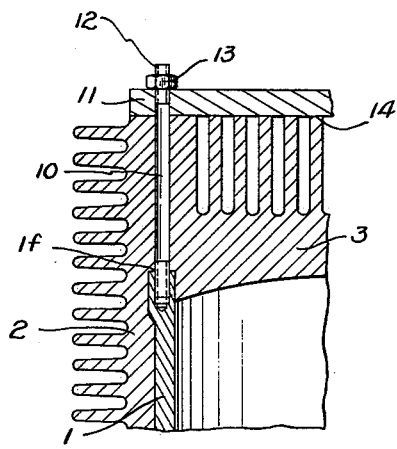
FIGURE 6 is a view similar to FIGURE 2 with still another modification of the invention.
Figure 7:
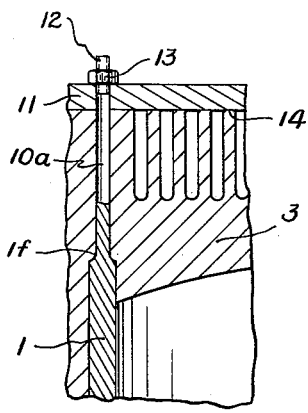
FIGURE 7 is a view similar to FIGURE 2 showing yet another modification of the invention.

In the modifications of FIGURES 6 and 7, at least two bolts are attached to the top edge 1f of liner 1, these bolts preferably being positioned diametrically on the liner. In FIGURE 6, the bolt 10a is threaded to the top of the liner extension and passes through the cylinder head portion 3. The exposed ends of the bolts extend through a bridge 11 which rests on the top surface 14 of head portion 3. Threaded ends 12 of the bolts receive nuts 13 so that the bridge 11 is tightened against the cylinder head. Consequently, the gas pressures acting on head portion 3 are transferred through bridge 11 and bolts 10 to liner 1 with the result that the head portion 3 is stiffened and bending stresses in the transition zone between head portion 3 and cylinder portion 2 disappear almost completely.

FIGURE 7 is similar to FIGURE 6 except that bolt 10a is integral with liner 1 rather than being threaded to the liner.

Figure 8:
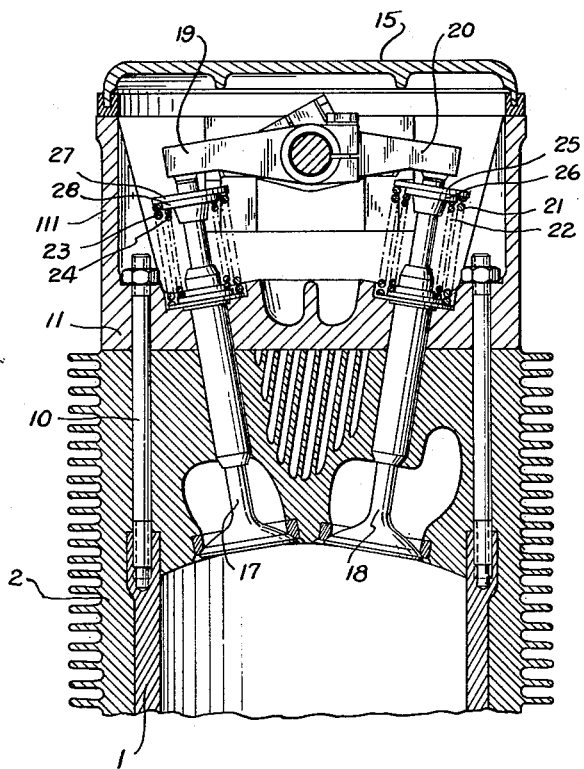
FIGURE 8 is a transverse sectional view through the monobloc cylinder showing the housing for the valve rocker arms.

FIGURE 8 is a modification of FIGURE 6 the bridge 11 being designed to form a housing for the valve rocker arms and their fittings. For this purpose the bridge is formed with a cylindrical extension 111 and a top cover 15. The space provided by the cylindrical extension accommodates a camshaft actuating the valves 17, 18 via rocker arms 19, 20 in the usual manner. The valves 17, 18 are forced against their seats and associated rocker arms by nested coil springs 21, 22 and 23, 24 bearing against spring retainers 25, 26 and 27, 28.

It is apparent that in each of these modifications, it is not necessary to increase the cross-sectional area between head portion 3 and cylinder portion 2 in order to take care of the stresses occurring in this zone.

Having now described the means by which the objects of the invention are obtained, we claim:

1. A monobloc air-cooled internal combustion engine cylinder comprising a cylinder liner, a single piece finned cylinder block portion and cylinder head portion cast around both sides of said liner, and said liner having an extension into said head portion for being tightly connected to said head portion only where said head portion joins said block portion for taking combustion gas pressure stresses from said head portion.

2. A cylinder as in claim 1, further comprising radially directed holes in said liner extension filled with cast cylinder material for forming an additional connection between said liner and head portion.

3. A cylinder as in claim 1, further comprising a dovetail joint between said liner extension and said head portion.

4. A cylinder as in claim 1, further comprising serrated grooves in said liner extension filled with cast cylinder material.

5. A cylinder as in claim 1, further comprising diametrically opposed bolt means joined to said liner extension and passing through said head portion, bridge means between said bolt means, and nut means threaded to said bolt means for tightening bridge means against said cylinder head portion.

6. A cylinder as in claim 5, said bridge means comprising valve rocker arm supporting means.

References Cited by the Examiner
UNITED STATES PATENTS

| | | | |
|---|---|---|---|
| 1,676,976 | 7/28 | Angle | 123—193 X |
| 2,085,976 | 7/37 | Heintz | 123—193 |
| 2,127,825 | 8/38 | Mader | 92—171 X |
| 2,184,820 | 12/39 | Tucker. | |
| 2,227,933 | 1/41 | Hersey | 123—41.69 |

RICHARD B. WILKINSON, *Primary Examiner.*
KARL J. ALBRECHT, *Examiner.*